Patented July 14, 1953

2,645,649

UNITED STATES PATENT OFFICE 2,645,649

PROCESS FOR IMPROVING THE DRYING QUALITIES OF HYDROCARBON CO-POLYMER DRYING OILS

Alfred E. Hoffman, Clarendon Hills, Ill., assignor to Universal Oil Products Company, Chicago, Ill., a corporation of Delaware No Drawing. Application November 30, 1950, Serial No. 198,480

15 Claims. (Cl. 260—410.6)

This invention relates to improved drying oils characterized as a modified co-polymer of a conjugated diolefin and a mono-isoolefin and to the process for the manufacture thereof. More specifically, the invention concerns a method of improving the air-drying properties of an unsaturated hydrocarbon type drying oil formed by the hydrogen fluoride catalyzed copolymerization of a conjugated diene and an aliphatic monoisoolefin, the product having superior drying properties when exposed as a thin film to atmospheric oxidation.

It is known that drying oils having excellent air-drying properties may be manufactured by the low-temperature, hydrogen fluoride-catalyzed co-polymerization of a conjugated diene and an aliphatic mono-isoolefin. The drying oil product is a colorless, transparent, viscous, predominantly hydrocarbon liquid which when spread as a thin film on a surface intended to receive a protective coating and exposed to atmospheric oxygen, dries rapidly to a smooth, glossy surface which is hard, tough, abrasion-resistant and resistant to weathering elements such as water, sunlight, and high as well as low temperatures. The drying oil product, although possessing many advantages over other hydrocarbon and unsaturated fatty acid ester drying oils occurring naturally or formed by other synthetic means has the undesirable property of undergoing embrittlement upon further ageing in contact with atmospheric oxygen. The latter is manifested in the tendency of the dried film to check and disintegrate, particularly on smooth surfaces to which the drying oil is applied in the form of a protective coating composition. The present invention concerns methods for modifying the structure and molecular composition of the above low-temperature co-polymer hydrocarbon drying oil to reduce the tendency of the oil to undergo the undesirable afterdrying changes which limit the usefulness of such oils as ingredients of protective coating compositions.

In accordance with one method of modifying the drying properties of a low temperature, hydrogen fluoride catalyzed copolymer of a conjugated diene and an aliphatic mono-isoolefin, said catalytic co-polymer is reacted with a polyhydric alcohol at a temperature of from about 50° to about 200° C. and at other reaction conditions sufficient to effect the condensation of said alcohol with the organic fluorides present in said co-polymer drying oil.

Another embodiment of this invention concerns a process for the improvement of a hydrogen fluoride catalyzed co-polymer of aliphatic mono-isoolefin and conjugated diolefin hydrocarbons which comprise reacting said catalytic co-polymer and a polyhydric alcohol in the ratio of from about 1 to 1 to about 100 to 1 weight proportions of the catalytic hydrocarbon co-polymer to polyhydric alcohol at a temperature of from about 50° to about 200° C. in the presence of a hydrogen fluoride reactive substance capable of combining with the hydrogen fluoride liberated from the condensation of organic fluorides contained in said catalytic hydrocarbon co-polymers and said polyhydric alcohol.

Other embodiments of the invention relating to specific reactants, the process of preparing the initial drying oil starting material and the method of effecting the present condensation reaction between said drying oil and the present polyhydric alcohol reactants will be referred to in greater detail in the following further description of the invention.

Hydrocarbon co-polymer drying oils of the type formed in the hydrogen fluoride catalyzed co-polymerization of aliphatic mono-isoolefin and conjugated diolefin hydrocarbons at temperatures generally below about 0° C., herein contemplated as the initial starting material in the preparation of the present improved drying oils are formed by a process developed by the art which relies upon special methods of preparation to obtain a hydrocarbon drying oil product having sufficient unsaturation and molecular weight to dry upon exposure to atmospheric oxygen to form a tough, hard, abrasion-resistant protective coating film. The method of preparation involves the co-polymerization of certain optimum proportions of a conjugated diolefinic hydrocarbon and an aliphatic mono-isoolefinic hydrocarbon, said hydrocarbons containing not more than about 8 carbon atoms per molecule, at a temperature below about 0° C., and preferably below about −40° C. to about −100° C. in an anhydrous hydrogen fluoride catalyzed reaction. During the co-polymerization the reactants are thoroughly stirred to obtain maximum interaction of the reactant hydrocarbons and to prevent the formation of solid resinous co-polymers which are insoluble in organic solvents and are otherwise unsuitable as drying oil components. Under these reaction conditions, and particularly as a result of utilizing the indicated proportions of hydrocarbon reactants as well as the technique of rapidly stirring the reactants upon contact thereof with the hydrogen fluoride catalyst at the low temperature utilized, the reactants are co-polymerized to products of intermediate molecular weight, generally from about 500 to about 5000 rather than the solid resinoid co-polymers of greater molecular weight formed when the above precautions as to reaction conditions and reacting proportions are not observed.

Suitable specific olefinic hydrocarbon starting materials containing not more than about 8 carbon atoms per molecule, utilizable as the reactant monomers in the preparation of the hydrocarbon co-polymer drying oils include such conjugated diolefins as butadiene-1,3, isoprene, hexadiene-1,3, 2-methylpentadiene-1,3, 4-methylpentadiene-1,3, 2,3-dimethylbutadiene-1,3, 3 methylhexadiene-1,3, and other homologs and analogs of the diolefin series and such compounds as isobutylene (2-methylpropene), 2-methylbutene-1, 3-methylbutene-1, 2-ethylbutene-1, 2,3-dimethylbutene-1, 3-methylhexene-1, and others representative of mono-isoolefins containing fewer than 8 carbon atoms per molecule. Of the above mono and diolefins, butadiene-1,3 and isobutylene are the preferred reactants in the preparation of the hydrocarbon co-polymer drying oil starting material, not only because of the generally greater availability of the above hydrocarbons, but for the further reason that being the lowest molecular weight isoolefin and conjugated diolefin of the above utilizable hydrocarbon monomers, they produce drying oils of maximum unsaturation per unit of molecular weight.

In the preliminary preparation of the catalyzed co-polymer drying oil starting materials containing organic fluorides, the conjugated diolefin and iso-monoolefin reactants are charged to the reaction in a certain critical proportion of diolefin to mono-isoolefin, that is, from about 60 to 100 to about 90 to 100 weight proportions respectively, and preferably from about 75 to 100 to about 90 to 100. In a preferred procedure, the olefin monomers are mixed in the above proportions in a preliminary step and thereafter contacted with the anhydrous hydrogen fluoride vapor catalyst which is introduced into the hydrocarbon reactants as hereinafter indicated, the monomers and catalyst being contacted at temperatures of from about 0° to about —100° C., preferably from about —40° to about —80° C. The control of the temperature variable in the reaction is considered to be a factor of preeminent importance in the production of the desired liquid co-polymer and for this purpose the reaction is generally effected in the presence of an internal refrigerant which evaporates and absorbs (by virtue of the latent heat of evaporation) the large quantity of heat liberated by the highly exothermic reaction at the point of polymer formation. An alternative arrangement in which the reaction mixture is externally cooled and the olefin monomers are rapidly and thoroughly mixed at the point they contact the hydrogen fluoride co-polymerization catalyst, may also be employed in the preparation of the drying oil starting material.

The internal refrigerant utilizable in the preliminary process for preparation of the present drying oil starting material is desirably a solvent or diluent for the reaction mixture and in thus acting as a dispersing agent of the monomer reactants, it further aids in control of the reaction temperature by controlling the rate of reaction and hence the rate of liberation of the exothermic heat of co-polymerization. Compounds which act as diluent and refrigerants include the low molecular weight paraffins, such as liquid propane and butane, the low molecular weight alkyl halides such as methylchloride, methylbromide, ethylchloride, dichlorodifluoromethane and the fluorocarbons, such as perfluoroethane, perfluoropropane and perfluorobutane. Refrigerants which are not solvents or diluents of the reactants but nevertheless may also be employed in the co-polymerization of the olefin monomers are such materials as solid carbon dioxide (Dry Ice) which acts as a refrigerant when introduced directly into the reaction mixture and allowed to vaporize as the reaction temperature tends to exceed the freezing or boiling points of the refrigerant.

The co-polymerization of the mono-isoolefin and conjugated diolefin reactants is effected in the presence of a catalyst consisting essentially of substantially anhydrous hydrogen fluoride containing less than about 10% by weight of water. In order to form the liquid co-polymers rather than the undesired solid resinous co-polymer product formed under other conditions, the catalyst is introduced gradually into the reaction mixture containing the olefinic hydrocarbons and diluent-refrigerant, and preferably in small quantities as the reaction proceeds. The total quantity of hydrogen fluoride introduced into the reaction mixture is from about 5 to about 25% by weight of the combined weight of mono- and diolefin monomer reactants.

Following completion of the reaction to the desired degree of polymerization, the hydrocarbon co-polymer may be separated from the catalyst by the addition of water, aqueous hydrogen fluoride, or an aqueous solution of sodium hydroxide, potassium hydroxide, ammonia or other neutralizing agent thereto, after which the aqueous phase is separated from the co-polymer, for example, by decantation. The latter operation dilutes the remaining free hydrogen fluoride or forms an inactive fluoride salt, stopping the polymerization of the olefinic reactants. Certain oxygen containing organic compounds such as alcohols, esters, ethers, phenols, etc. also combine with the hydrogen fluoride to form complexes therewith and free the co-polymer product. Similarly, certain inorganic salts such as sodium fluoride, potassium fluoride, lithium fluoride and others combine with the hydrogen fluoride to form double salts, which are relatively inactive, such as $NaF \cdot HF$; anhydrous ammonia and the amines, particularly the high boiling amines such as aniline, pyridine and others form amine hydrogen fluoride salts which when subsequently heated may be decomposed to recover not only the organic amine for recycle purposes, but the hydrogen fluoride as well in an anhydrous state for recycle to the polymerization stage of the process.

The co-polymer product as separated from the catalyst in the polymerization reaction mixture, although constituting a considerable advance over the drying oil products previously on the market nevertheless contain a small amount of organically bound fluorine in the molecular structure of the hydrocarbon co-polymer, generally not more than about 2% by weight of the co-polymer product. These fluorides have been found to markedly affect the drying rate of the product and the ultimate film obtained on complete drying of the film when exposed to atmospheric oxygen. The hydrocarbon co-polymers having molecular weights of from about 500 to about 5000 and contain the above quantity of organically bound fluorine, to the extent of at least one atom of fluorine per molecule of hydrocarbon co-polymer and in the higher molecular weight components of the hydrocarbon mixture as high as about 4 to 5 atoms of organically bound fluorine per molecule. Although some of the carbon to fluorine bounds are relatively weak and may be hydrolyzed by treatment of the co-polymer with hot aqueous caustic or other basic reagent, a certain proportion of the fluorides, always present to some extent in the co-polymer product, are not readily dehydrafluorinated even by treatment under pressure with aqueous caustic at elevated temperatures. These fluorides, as well as the weakly associated fluoride compounds, tend to be corrosive when applied as a protective coating to surfaces susceptible to corrosion, particularly metallic surfaces. The action of the organic fluorides in causing corrosion is believed to be the result of the slow decomposition of the organic fluorides when the drying oil film as a paint, varnish or other protective coating undergoes weathering when exposed to sunlight, moisture and variations in temperature. The fluorides which are unstable under weathering conditions are believed to liberate small quantities of free hydrogen fluoride, or in the absence of actual decomposition, are believed to act as acidic substances which cause the continued polymerization of the hydrocarbon co-polymer comprising the film of protective coating composition. The resulting advance in polymerization is believed to continue until high molecular weight, brittle resinous materials which have the tendency to check and break from the underlying surface are ultimately formed. By means of the process of the present invention wherein the fluoride-contaminated drying oils are reacted by condensation with a polyhydric alcohol, the carbon-fluorine bonds are replaced by carbon-oxyalkylene bonds and the fluorine atoms formerly present in the structure of the hydrocarbon co-polymer compounds are eliminated or converted to a form which does not promote the continued polymerization of the hydrocarbon drying oil film after drying and subsequent exposure to weathering conditions. The present treatment of the co-polymer hydrocarbon drying oil thus introduces into the molecular structure of the co-polymer hydrocarbons an alkoxy group, which in the case of the polyhydric glycols, have additional hydroxyl groups which increase the functionality of the drying oil molecule and enhances the drying qualities, particularly the drying rate of the product.

Suitable polyhydric alcohols utilizable in the present process for reaction with the copolymer drying oil preferably contain at least two hydroxyl groups per molecule, typical representative compounds of this class of reactants including glycerol, pentaerythritol, polypentaerythritol, inositol, polyinositol, 2,2-dimethylolpropanol, ethylene glycol, propylene glycol and homologous members of the glycol series as well as polymers of the aliphatic glycols, such as polyethylene glycol containing up to about 500 oxyethylene groups per molecule, polypropylene glycol containing up to about 300 oxypropylene groups per molecule and other polymeric homologous oxyalkylene glycols. The preferred specific members of the above group are the polyhydric alcohols containing more than 2 hydroxyl groups per molecule such as glycerol, inositol, etc.

The condensation reaction of the present invention is effected by reacting from about 1 to 1 to about 100 to 1 proportions of the hydrocarbon copolymer drying oil containing the organic fluoride components to polyhydric alcohol at a temperature of from about 50° to about 250° C., preferably at a temperature of from about 100° to about 200° C., for a reaction period sufficient to effect substantially complete elimination of the organically bound fluoride from the drying oil, generally after a period of reaction of from about ½ to about 10 hours. The reaction may be conducted in the presence of a substance which tends to absorb or react with the liberated hydrogen fluoride thus eliminating the catalytically active hydrogen fluoride from the reaction mixture, the latter substances being referred to as a hydrogen fluoride scavenger materials. These may comprise one or more compounds selected from the group characterized generally as basic or alkaline substances or a compound which combines with the free hydrogen fluoride in the system to form a crystalline addition complex therewith. The preferred compounds for this purpose are the materials which form products with hydrogen fluoride which are substantially insoluble in the resultant modified drying oil, thus providing a means for readily removing the hydrogen fluoride reaction product from the desired drying oil product, as for example, by filtration, aqueous extraction, distillation, etc. Suitable substances which act as scavenging agents include the mono- and polyalkyl amines, particularly the high molecular weight amines, such as dodecylamine, analine, pyridine, quinoline etc., the alkanol amines such as the mono-, di-, triethanol amines, the alkali metal and alkaline earth metal hydroxides, carbonates and oxides and certain inorganic salts which form crystalline addition complexes with hydrogen fluoride, such as sodium fluoride, lithium fluoride, etc. Amines when used for this purpose have the advantage of being initially soluble in the modified drying oil product, and subsequently form an insoluble amine hydrofluoride salt by reaction with the hydrogen fluoride as the latter is liberated from the organic fluorides contained in the initial drying oil starting material. The amine hydrofluoride salt may thereafter be filtered or extracted from the reaction mixture for recovery of the amine.

Following the condensation reaction of the fluoride-contaminated hydrocarbon co-polymers with the polyhydric alcohol, or alternatively, during the condensation reaction, carboxylic acids may be incorporated into the reaction mixture to form ester alkyds with the unreacted free hydroxyl group of the polyhydric alcohol reactant. The long chain saturated and unsaturated fatty acids and their partial esters such as the mono- and diglycerides are preferred for this purpose, since the product is compatible with the hydrocarbon drying oil and in many instances, particularly when the unsaturated fatty acids and their esters are employed in the reaction, the product dries upon exposure to atmospheric oxygen and enhances the film-forming properties of the modified drying oil product. Typical acids and their esters are such compounds as oleic acid, linoleic acid, linolenic acid, palmitic acid, anacardic acid, ricinoleic acid, margaric acid, abietic or rosin acids, maleic acid, succinic acid, adipic acid, etc., preferably the unsaturated acids, such as linoleic and linolenic acids. The esters which occur naturally derived from various animal, vegetable and marine sources may also be incorporated into the composition, particularly when the ester is a drying oil such as linseed oil, tung oil, dehydrated castor oil, oiticica oil, and other less rapidly drying oils such as walnut oil, hempseed oil, etc. Incorporation of the above compounds and substances into the drying oil may be effected by heating the initial hydrocarbon co-polymer drying oil, polyhydric alcohol and carboxylic acid or ester as a mixture, or the condensation product of the hydrocarbon co-polymer and polyhydric alcohol may be reacted with the carboxylic acid ester at a temperature of from about 50° to about 250° C., with an acid-acting condensation catalyst, if desired, to enhance the rate of reaction. Suitable acid acting catalysts useful for promoting the condensation reaction are such compounds as aluminum chloride, aluminum bromide, boron trifluoride or complex addition compounds thereof with certain organic oxygen-containing compounds, such as the ethers, alcohols, esters, etc., the addition complexes being referred to in the art as "Ansolvo Acids." Following the catalyzed reaction, the catalyst may be removed from the mixture of products by aqueous extraction, etc.

The drying oil recovered from the condensation reaction is a predominantly hydrocarbon product containing a small number of carbon-oxygen linkages formed by virtue of the condensation of the organic fluorides with the polyhydric alcohol reactant. The oil is a viscous, generally colorless and transparent material containing numerous unsaturated linkages, generally from about 10 to about 100 olefin bonds per molecule, depending upon the molecular weight of the product. When applied as a thin film on the surface of a metal or other material designated to receive a protective coating, the oil dries rapidly to form a tough, hard, abrasion-resistant protective film which adheres to the surface to which it is applied, even under drastic weathering conditions. The films are stable in the presence of sunlight and moisture and thus resist undesirable discoloration and peeling, characteristic of the unmodified hydrocarbon co-polymer drying oil. The dried films are resistant to the action of moisture and alkali, although the tendency to undergo changes in structure upon exposure to the latter agents increases as the number of alkali-sensitive groups in the molecular structure of the product increases, including the carboxyl and hydroxyl radicals introduced by means of the alternative secondary reactions herein provided. The desirable drying characteristics of the product render the drying oil useful in the formulation of protective and decorative coatings, such as paints, varnishes, lacquers, etc., as a component in printing oil compositions of the air-drying type, and its highly unsaturated structure enables it to undergo reaction with sulfur, sulfur halides and thiuram compounds to form factices thereof.

The present invention will be further illustrated in the following examples in which specific reactants and process procedures involved in the present process will be further described. The examples, however, are not intended to limit the generally broad scope of the invention in strict accordance therewith.

*Example*

A hydrocarbon drying oil co-polymer of butadiene and isobutylene was prepared in the following reaction to provide the starting material for the preparation of the present modified co-polymer products. A mixture of 100 grams of liquid propane, 29.1 grams of isobutylene and 177 grams of butadiene was introduced into a copper vessel containing dry ice as a refrigerant. The mixture was rapidly stirred and maintained at a temperature of approximately −40° to −75° C., as 13 grams of anhydrous hydrogen fluoride vapor mixed with nitrogen was carried into the reaction mixture over a period of approximately 4 hours, the exothermic heat of the reaction causing the propane to vaporize into the Dry Ice condenser attached to the copper reaction vessel, condensing therein and refluxing into the reaction mixture. Following the above reaction, 50 grams of ethyl alcohol also added to the stirred reaction mixture and 100 grams of benzene was subsequently introduced into the mixture, causing the formation of a two-phase system. The phases were separated by decantation and the benzene-containing layer distilled to remove the benzene therefrom. 60 grams of a liquid, clear, transparent oil remained in the distillation flask as a residue after removal of the benzene solvent, the residual oil comprising the co-polymer of butadiene and isobutylene. The recovered product had an apparent bromine number of approximately 74 and a cryoscopic molecular weight of approximately 950. Quantitative chemical hydrogenation indicate that the material contained 1 double bond per 4.6 carbon atoms and analysis of the product for fluorine indicated that the material contained approximately 1.2% fluorine as organically bound fluorides. When spread as a thin film on a test panel and exposed to atmospheric oxygen, the co-polymer hydrocarbon drying oil dried to a completely tack-free film in less than 48 hours, but upon further exposure to the atmosphere, sunlight, and rain, the film became brittle and developed cracks after a period of approximately 36 days of exposure.

The hydrocarbon co-polymer drying oil as prepared above was reacted with pentaerythritol to form a modified co-polymer drying oil in accordance with the following procedure. 100 grams of the butadiene-isobutylene co-polymer drying oil as prepared above was mixed with 10 grams of pentaerythritol and the mixture heated at 120° to 150° C. for 6 hours, after which the product was washed with water and dried. The cryoxcopic molecular weight had increased as a result of the above treatment, the viscosity of the product had also increased and when subjected to atmospheric drying, the product dried to a tack-free film in less than 40 hours and was substantially harder by the Sward hardness testing procedure than the film obtained from the unmodified butadiene-isobutylene co-polymer. In a weather test of the product, it remained substantially colorless, tough and abrasion-resistant after 36 days on test. The product furthermore failed to check or peel from the test panels from the above weather exposure test.

I claim as my invention:
1. A process for improving the air-drying properties of a liquid co-polymer resulting from the co-polymerization of an aliphatic mono-isoolefin hydrocarbon and a conjugated diolefin hydrocarbon, each containing not more than about 8 carbon atoms per molecule, in the presence of hydrogen fluoride catalyst at a temperature of from about −100° to about 0° C., whereby the co-polymer contains organic fluorides, said process comprising separating said liquid co-polymer from the hydrogen fluoride catalyst and thereafter commingling therewith a polyhydric alcohol in the ratio of from about 1 to 1 to about 100 to 1 weight proportions of co-polymer to polyhydric alcohol, and subjecting the resultant mixture to reaction at a temperature of from about 50° to about 250° C. to effect substantial condensation of the hydroxyl groups of said alcohol with the organic fluorides in the co-polymer.

2. The process of claim 1 further characterized in that said co-polymer and polyhydric alcohol are reacted in the presence of a basic compound capable of combining with free hydrogen fluoride.

3. The process of claim 1 further characterized in that said co-polymer and polyhydric alcohol are reacted with a carboxylic acid.

4. The drying oil product of the process of claim 3.

5. The process of claim 3 further characterized in that said carboxylic acid is an unsaturated fatty acid containing at least 12 carbon atoms per molecule.

6. The process of claim 5 further characterized in that said fatty acid is selected from the group consisting of oleic, linoleic, and linolenic acids.

7. The process of claim 1 further characterized in that said liquid co-polymer is formed by co-polymerizing a mixture containing from about 60 to about 95% of said conjugated diolefin hydrocarbon and from about 5 to about 40% of said aliphatic mono-isoolefin hydrocarbon.

8. The process of claim 7 further characterized in that said mixture of conjugated diolefin and mono-isoolefin contains from about 75 to about 90% of said conjugated diolefin.

9. The process of claim 1 further characterized in that said liquid co-polymer is formed by co-polymerizing said diolefin and mono-isoolefin at a temperature of from about −40° to about −80° C.

10. The process of claim 1 further characterized in that said conjugated diolefin is butadiene-1,3 and said mono-isoolefin is isobutene.

11. The drying oil product of the process of claim 10.

12. The process of claim 1 further characterized in that said polyhydric alcohol contains at least 3 hydroxyl groups per molecule.

13. The process of claim 12 further characterized in that said polyhydric alcohol is glycerol.

14. The process of claim 12 further characterized in that said polyhydric alcohol is pentaerythritol.

15. The drying oil product of the process of claim 1.

ALFRED E. HOFFMAN.

References Cited in the file of this patent

UNITED STATES PATENTS

| Number | Name | Date |
|---|---|---|
| 2,023,495 | Thomas | Dec. 10, 1935 |
| 2,548,503 | Sparks et al. | Apr. 10, 1951 |
| 2,582,411 | Bloch et al. | Jan. 15, 1952 |